(12) United States Patent
Mitamura et al.

(10) Patent No.: US 8,328,436 B2
(45) Date of Patent: Dec. 11, 2012

(54) OPTICAL MODULE

(75) Inventors: Kazuhiro Mitamura, Kanagawa (JP);
Shigeru Moribayashi, Kanagawa (JP);
Junichi Shimizu, Kanagawa (JP);
Hideyuki Yamada, Kanagawa (JP);
Shunsuke Okamoto, Kasugai (JP);
Masahiko Takeda, Kasugai (JP);
Shigeki Asahi, Seki (JP); Hiroki Itakura, Kitanagoya (JP)

(73) Assignees: Renesas Electronics Corporation, Kanagawa (JP); Sei Optifrontier Co., Ltd., Kanagawa (JP)

( * ) Notice: Subject to any disclaimer, the term of this patent is extended or adjusted under 35 U.S.C. 154(b) by 20 days.

(21) Appl. No.: 12/727,369

(22) Filed: Mar. 19, 2010

(65) Prior Publication Data
US 2010/0239212 A1 Sep. 23, 2010

(30) Foreign Application Priority Data
Mar. 30, 2009 (JP) .................................. 2009-081127

(51) Int. Cl.
*G02B 6/36* (2006.01)
(52) U.S. Cl. ......................................................... 385/93

(58) Field of Classification Search ...................... 385/93
See application file for complete search history.

(56) References Cited

U.S. PATENT DOCUMENTS
7,298,941 B2 * 11/2007 Palen et al. ..................... 385/33

FOREIGN PATENT DOCUMENTS
| JP | 2008-139446 | 6/2008 | | |
| JP | 2008-292676 | 12/2008 | | |
| JP | 2008292676 A | * 12/2008 | ...................... 385/31 |
| WO | WO 2010050651 A1 | * 5/2010 | ...................... 359/641 |

OTHER PUBLICATIONS

Japanese Official Action—2009-081127—May 30, 2012.

* cited by examiner

*Primary Examiner* — Jerry Blevins
(74) *Attorney, Agent, or Firm* — Young & Thompson

(57) ABSTRACT

An optical module includes a receptacle for receiving an optical connector attached to a distal end of an optical fiber, and a lens body having a contact surface coming into contact with the distal end of the optical fiber when the receptacle receives the optical connector. The lens body has the contact surface and an opposing surface opposing the contact surface, and further has a columnar base held by the receptacle, a lens portion formed on the opposing surface integrally with the base, and a flat portion. The lens portion is surrounded by the flat portion and is off-centered with respect to the base.

7 Claims, 16 Drawing Sheets

OPTICAL MODULE

This application is based upon and claims the benefit of priority from Japanese patent application No. 2009-081127, filed on Mar. 30, 2009, the disclosure of which is incorporated herein in its entirety by reference.

BACKGROUND OF THE INVENTION

This invention relates to an optical module, and particularly to an optical communication transmission or reception module.

Coaxial type transmission or reception optical modules installed in XFP (10 Gigabit Small Form Factor Pluggable) or other optical transceivers are classified into those for Telecom (telephone system) applications covering a communication distance of 10 km to 40 km and those for Datacom (data communication) applications covering a communication distance of 220 m to 10 km.

Optical modules for Telecom applications are required by related standards to have an internal reflection attenuation of 27 dB or higher. In order to satisfy this requirement, some related optical modules for Telecom applications are designed such that the optical axis of a sleeve inserted into one end of a ferrule holding an optical fiber is offset from the optical axis of a lens portion of an optical element mounted at the other end of the sleeve. This type of optical module is described in Japanese Laid-Open Patent Publication No. 2008-292676, for example.

SUMMARY OF THE INVENTION

These inventors have found that optical elements used in the related optical modules have a shape susceptible to be chipped during fabrication thereof. The inventors have also found that such optical elements used in the related optical modules are apt to tilt due to their shapes during integral molding of sleeves (receptacles).

This invention seeks to provide an optical module capable of solving at least one of the problems mentioned in the above.

According to an aspect of this invention, an optical module comprises a receptacle which receives an optical connector attached to a distal end of an optical fiber, and a lens body which has a contact surface coming into contact with the distal end of the optical fiber when the optical connector is received by the receptacle. The lens body has the contact surface and an opposing surface opposing the contact surface. The lens body further has a columnar base held by the receptacle, a lens portion formed on the opposing surface integrally with the base, and a flat portion. The lens portion is surrounded by the flat portion and off-centered with respect to the base.

According to this optical module, the lens portion of the lens body is formed to be surrounded by a flat portion of the base. Accordingly, the lens body is difficult to be chipped off when it is formed by molding and, moreover, the lens body can be placed stably in a receptacle forming mold.

DESCRIPTION OF EXEMPLARY EMBODIMENTS

Firstly, a related optical module will be described with reference to the drawings in order to facilitate the understanding of this invention.

Figure 1:
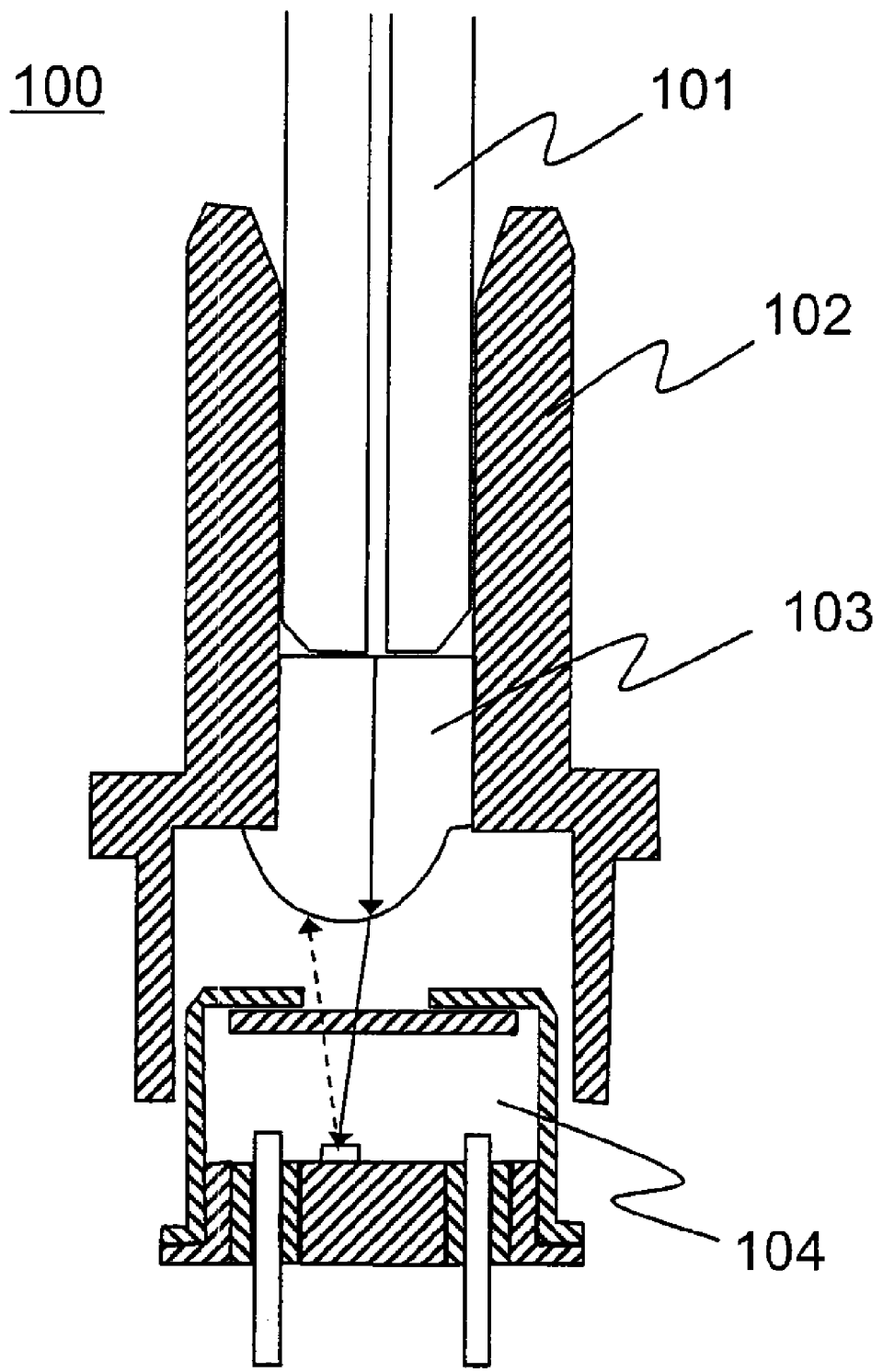
FIG. 1 is a cross-sectional view showing a configuration of a related optical module.

FIG. 1 is a longitudinal cross-sectional view of a related optical module 100. The optical module 100 has a receptacle 102 for receiving an optical connector 101, a glass lens 103, and a CAN package 104 having light-emitting or light-receiving elements such as a semiconductor laser and a photodetector mounted therein.

In order to satisfy requirements on light reflection attenuation as specified in related standards, this optical module 100 employs PC (Physical Contact) connection in which the distal end of an optical fiber included in the optical connector 101 is placed in contact with a surface (contact surface, or the upper face as viewed in the figure) of the glass lens 103. Further, in order to minimize the reflected return light (light emitted from the optical fiber may return into the optical fiber due to reflection), the central axis of the lens portion of the glass lens 103 located on the opposing surface opposing the contact surface (the convex portion on the lower side as viewed in the figure) is offset from the central axis of an optical connector insertion opening of the receptacle 102.

Figure 2A:
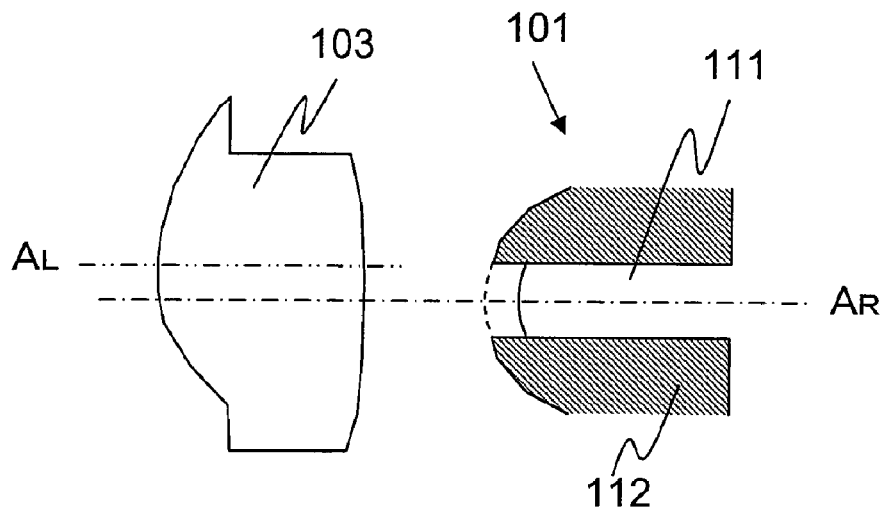
FIG. 2A is a diagram showing a state before an optical connector 71 in the optical module shown in FIG. 1 is connected to a glass lens 73 by physical connection.

More specifically, when the optical connector 101 is inserted into the receptacle 102, as shown in FIG. 2A, the distal end of the optical connector 101 is brought close to the glass lens 103. The optical connector 101 has an optical fiber 111 and a ferrule 112 attached to the distal end of the optical fiber.

Figure 2B:
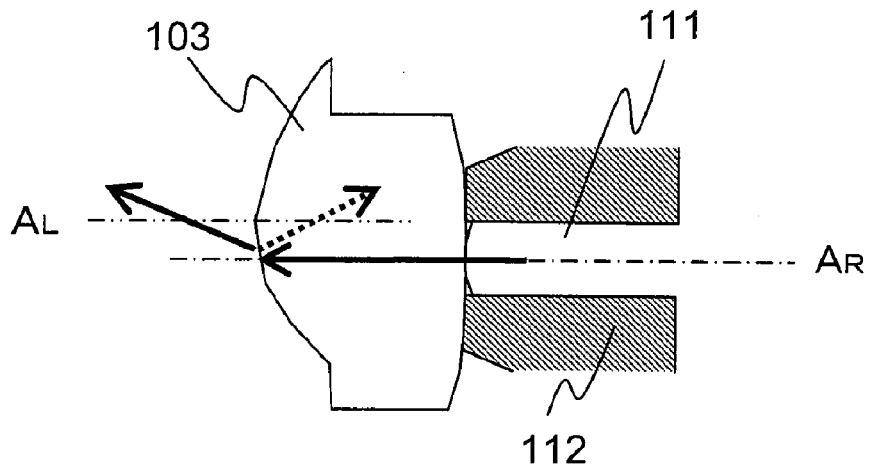
FIG. 2B is a diagram showing a state in which the optical connector 71 has been connected to the glass lens 73 by physical connection.

When the optical connector 101 is inserted further into the inside of the receptacle 102, as shown in FIG. 2B, the distal end of the ferrule 112, which is spherically formed, is elastically deformed, and the end of the optical fiber 111 is pressed against the contact surface of the glass lens 103. Thus, the optical fiber 111 and the glass lens 103 are PC-connected to each other.

Figure 2C:
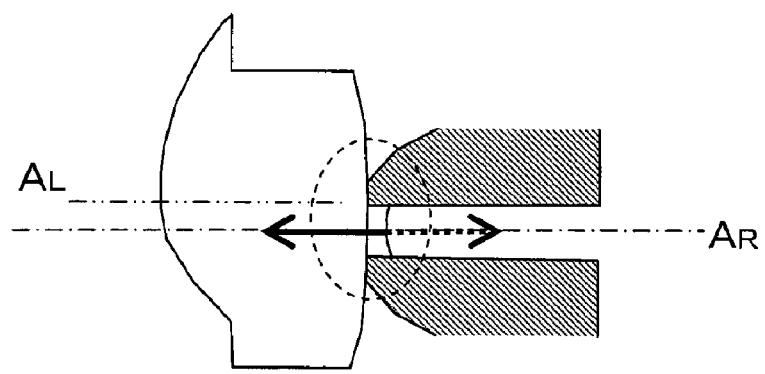
FIG. 2C is a diagram showing a state in which the optical connector 71 is not correctly connected to the glass lens 73 by physical connection.

If the optical fiber 111 is not pressed against the glass lens 103 with a sufficient pressure or there is dirt or dust between them, creating a gap between the optical fiber 111 and the glass lens 103, as shown in the dashed-line circle in FIG. 2C, light propagated through the optical fiber 111 is partially reflected (Fresnel-reflected) at the end face of the optical fiber 111. As a result, it becomes impossible to satisfy the requirement of a light reflection attenuation of 27 dB or higher required for light emitting/receiving optical modules, as specified in SONET OC-48 or other standards.

Fresnel reflection occurs also at the surface of the lens portion of the glass lens 103. However, as shown in FIG. 2B, the central axis $A_L$ of the lens portion of the glass lens 103 is offset from the central axis $A_R$ of the insertion opening for inserting the optical connector 111 (generally, corresponding to the central axis of the optical connector). Therefore, the Fresnel-reflected light is reflected in a direction indicated by the dotted-line arrow. Thus, little reflected return light will enter the optical fiber 111.

Figure 3A:
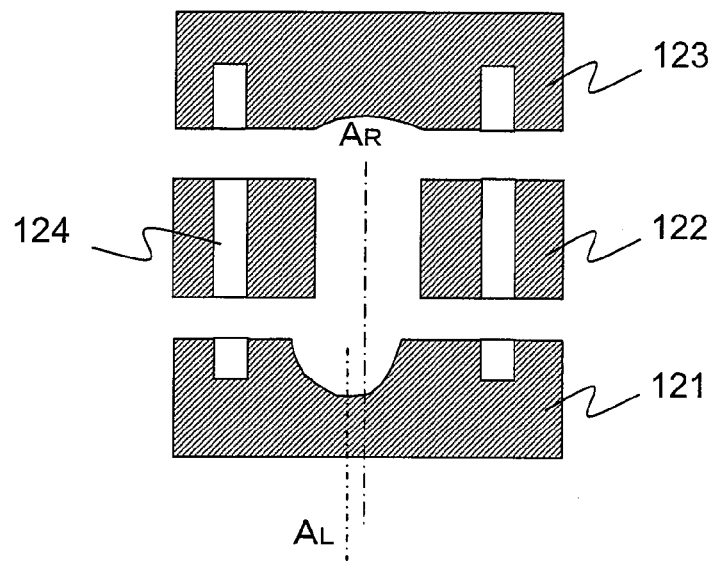
FIGS. 3A to 3C are diagrams for explaining a fabrication method of a glass lens included in the optical module of FIG. 1, FIG. 3A showing a configuration example of a mold used for the fabrication, FIG. 3B showing a state in which a glass material is placed in the mold, FIG. 3C showing a state in which the glass material placed in the mold is hot pressed.

The glass lens 103 is fabricated (formed) using a mold as shown in FIG. 3A, for example. The shown mold is divided into three parts consisting of a lower mold 121, a middle mold 122, and an upper mold 123, and has guide holes or bores 124 to insert mold guides for alignment.

Figure 3B:
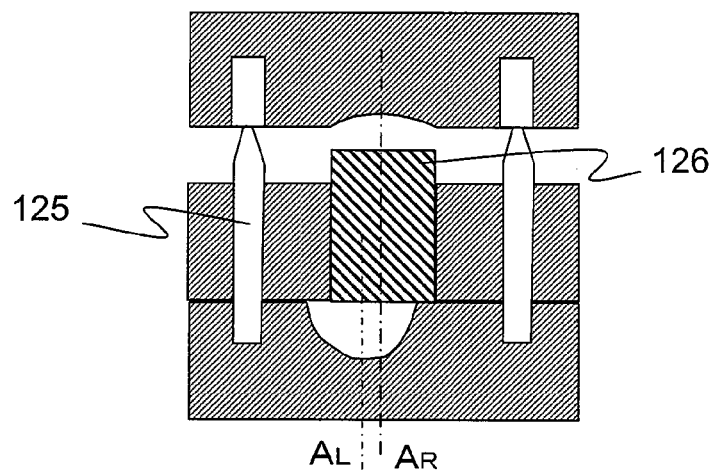
Figure 3C:
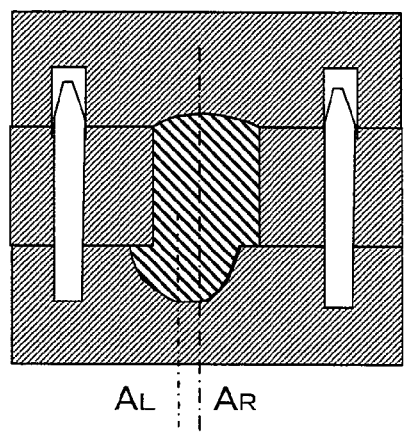

The fabrication of the glass lens 103 is started, as shown in FIG. 3B, by combining the lower mold 121 and the middle mold 122 using the mold guides 125 and placing a glass material 126 having an appropriate shape (e.g. circular columnar or quadrangular columnar shape) in the mold. Further, the upper mold 123 is combined, using the mold guides 125, and the placed glass material 126 is heated to a temperature equal to or higher than the glass transition point but equal to or lower than the softening point (heated to a state in which the glass material is not completely molten and becomes clay-like). The heated glass material 126 is then pressed to transfer a lens shape thereto (FIG. 3C). If the temperature is raised higher than the softening point to melt the glass material 126 completely, it takes a considerably long time to raise the temperature, possibly leading to various problems such as reduced lifetime of the mold, and chips in the fabricated lens glass caused by the glass sticking on the mold.

Figure 4A:
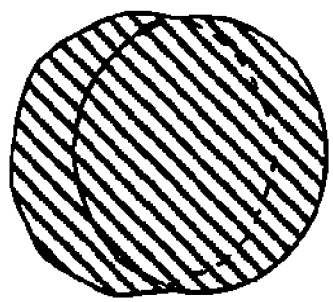
FIG. 4A and FIG. 4B are respectively a plan view and a side view of the glass lens included in the optical module of FIG. 1.
Figure 4B:
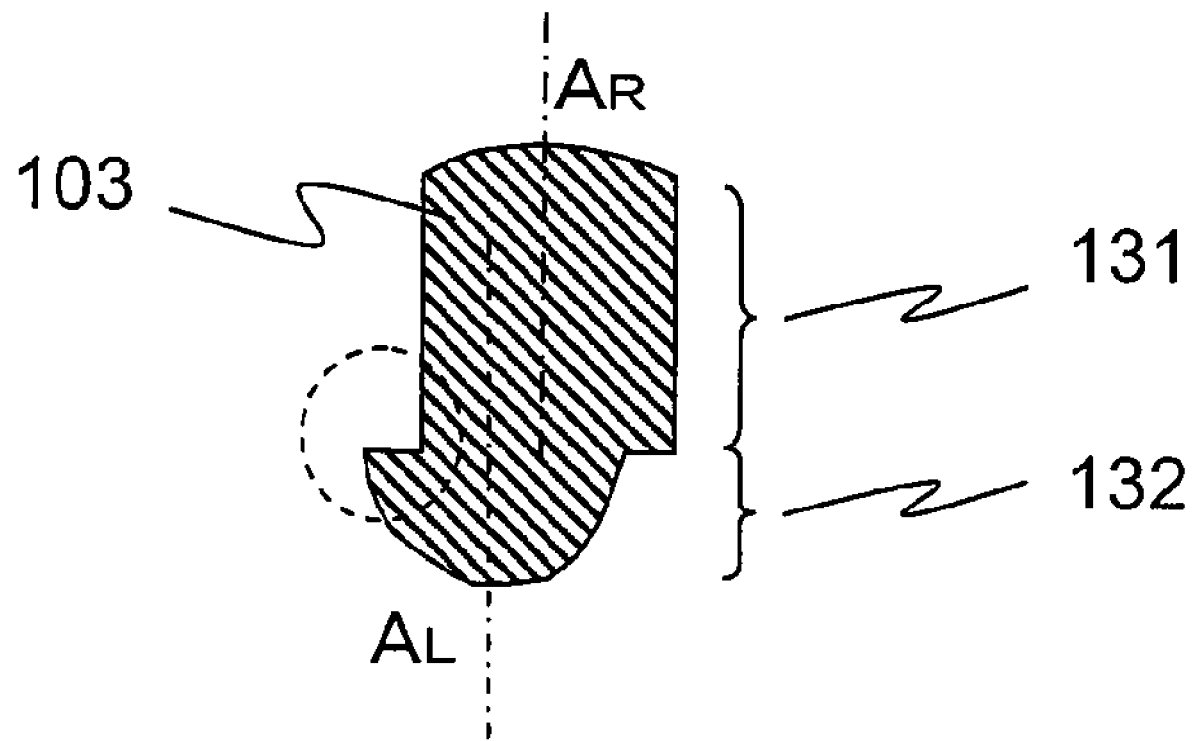

FIG. 4A and FIG. 4B are respectively a plan view and a side view of the fabricated glass lens 103. As shown in FIG. 4A and FIG. 4B, the glass lens 103 has a base 131 and a lens portion 132 both of which have a substantially equal diameter, while the central axis $A_R$ of the base 131 and the central axis $A_L$ of the lens portion 132 are offset from each other. Therefore, a part of the lens portion 132 projects out from the side face of the base 131, as shown in the dashed-line circle in FIG. 4B.

Next, a method of fabricating the receptacle 102 will be described.

The receptacle 102 is formed by injection molding so as to be integrated with the glass lens 103 fabricated as described above. The molding is performed by using a mold shown in FIG. 5, for example.

Figure 5:
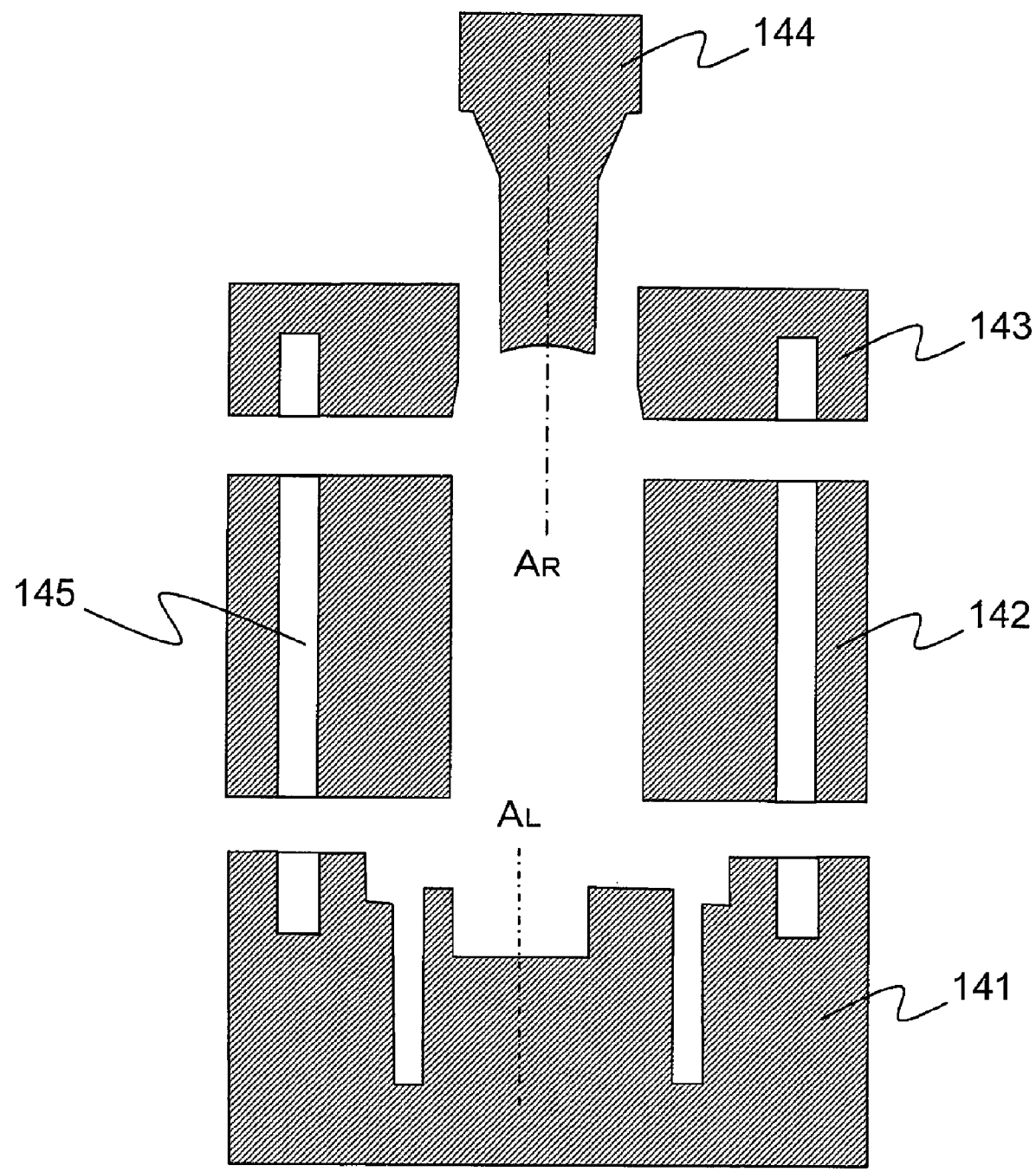
FIG. 5 is a diagram showing a configuration example of the mold used for fabrication of a receptacle included in the optical module of FIG. 1.

The mold of FIG. 5 includes a lower mold 141, a middle mold 142, an upper mold 143, and an optical connector insertion hole forming pin 144. Guide holes or bores 145 for inserting mold guides are formed in the lower mold 141, the middle mold 142 and the upper mold 143.

Figure 6A:
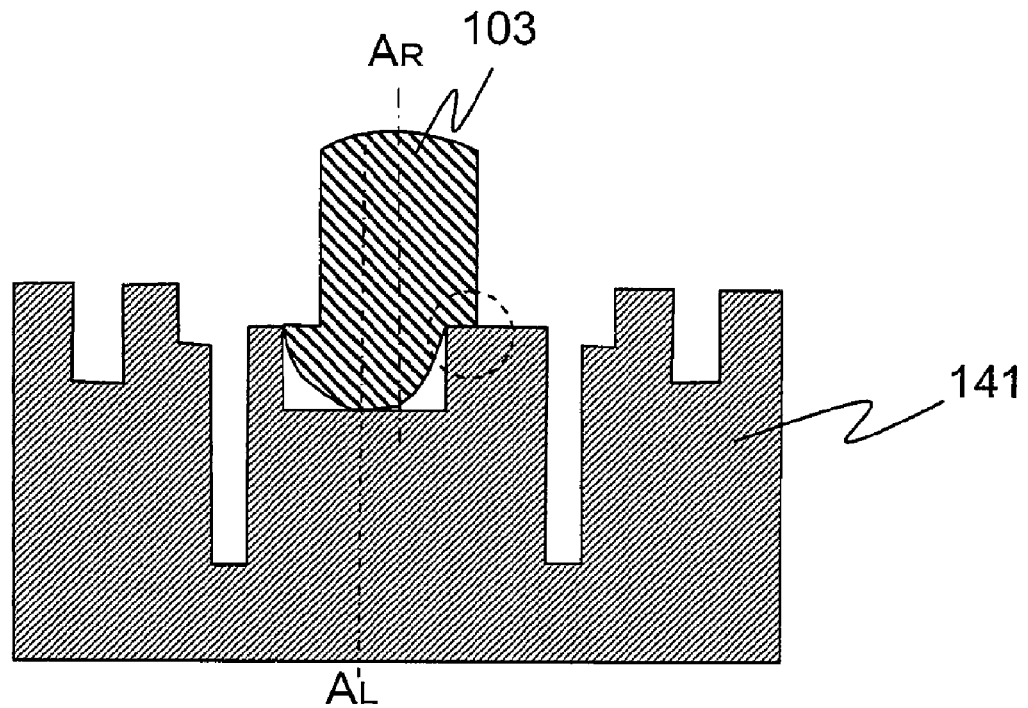
FIG. 6A and FIG. 6B are respectively an A-A cross-sectional view and a plan view showing a state in which the glass lens is placed on the lower mold of the receptacle fabricating mold.
Figure 6B:
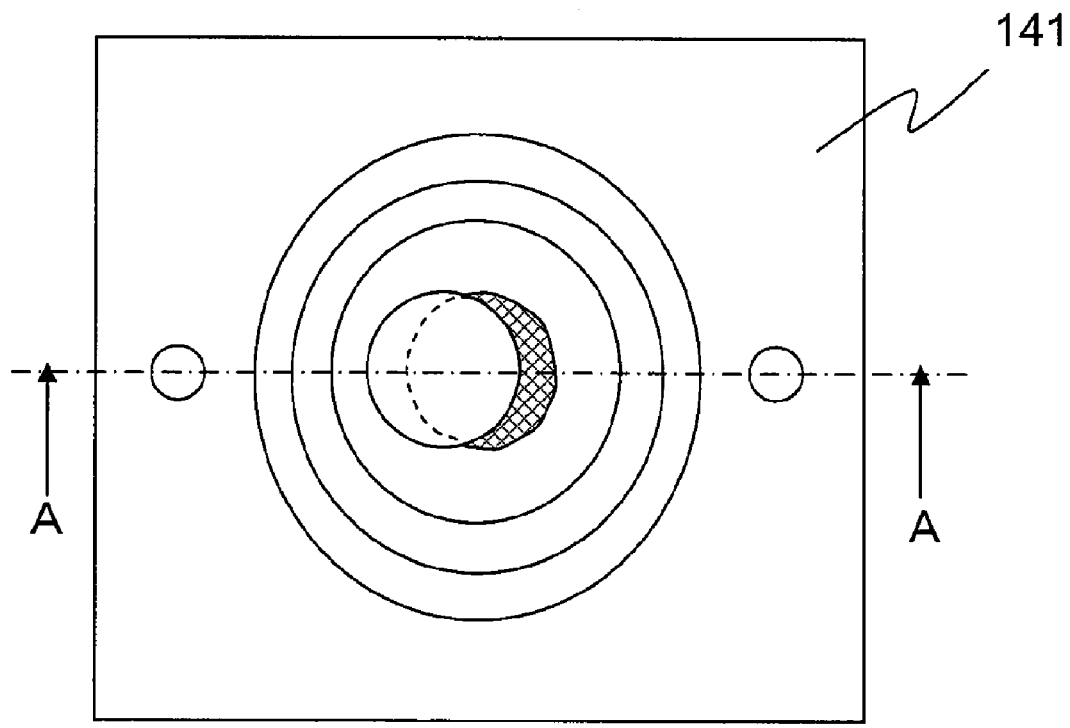

Fabrication of the receptacle 102 is started by placing the glass lens 103 on the lower mold 141 as shown in FIG. 6A and FIG. 6B. A part of the surface of the glass lens 103 opposite to the contact surface of the base 131 comes into contact with the surface of the lower mold 141 as shown in the dashed-line circle in FIG. 6A. This contact region is indicated by cross-hatching in FIG. 6B. As seen from FIG. 6A and FIG. 6B, the glass lens 103 is supported by the lower mold 141 in an off-centered position.

Figure 7:
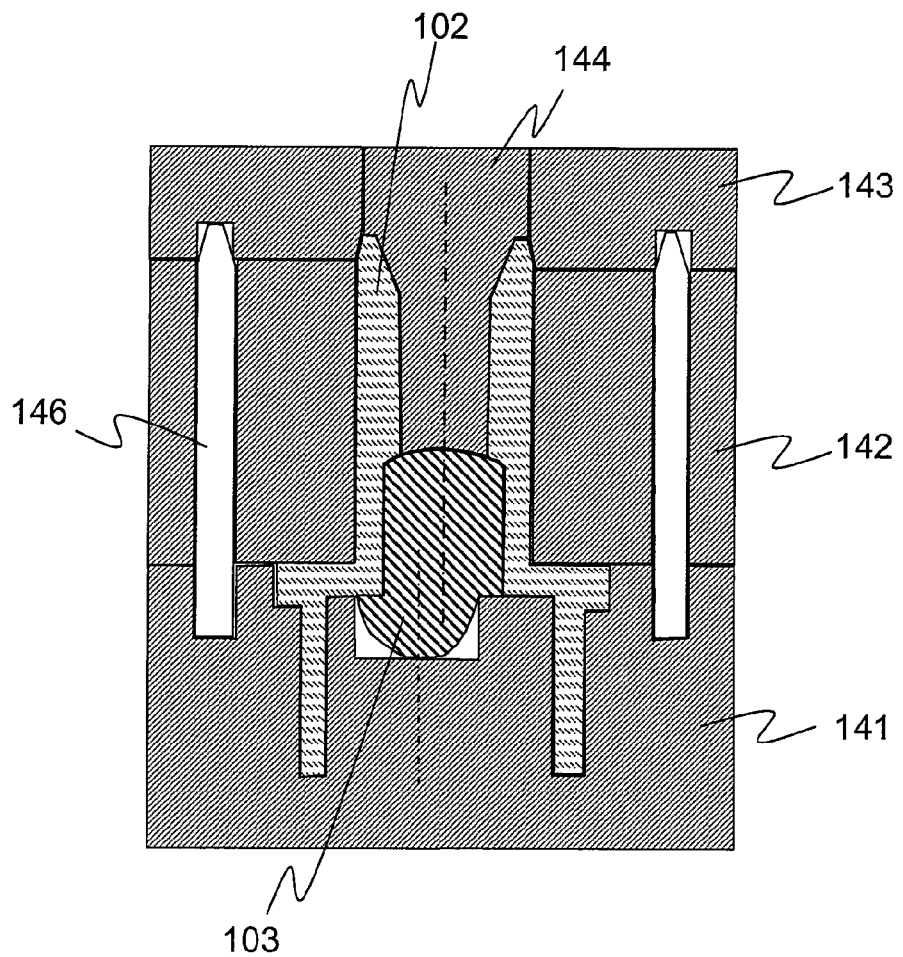
FIG. 7 is a diagram showing a state in which the receptacle has been formed by injection molding in the mold.
Figure 8:
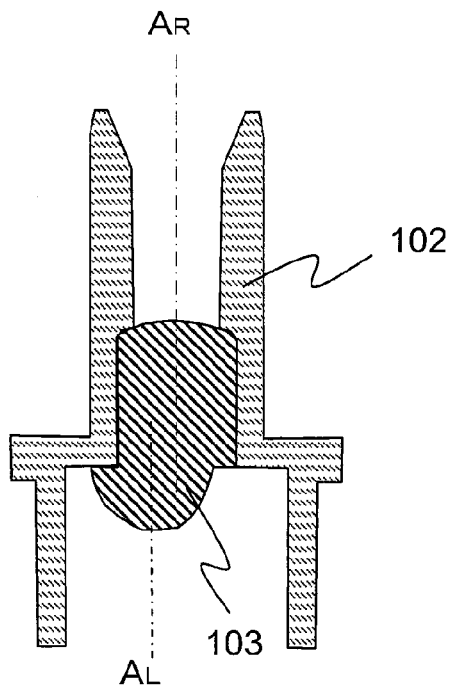
FIG. 8 is a diagram showing the receptacle which is formed by injection molding and integrated with the glass lens.

In the next step, as sown in FIG. 7, the middle mold 142 and the upper mold 143 are combined with the lower mold 141 with the use of the mold guides 146. After further combining the insertion hold forming pin 144, injection molding is performed, using the mold. Thus, the receptacle 102 integrated with the glass lens 103 as shown in FIG. 8 can be obtained.

Figure 9:
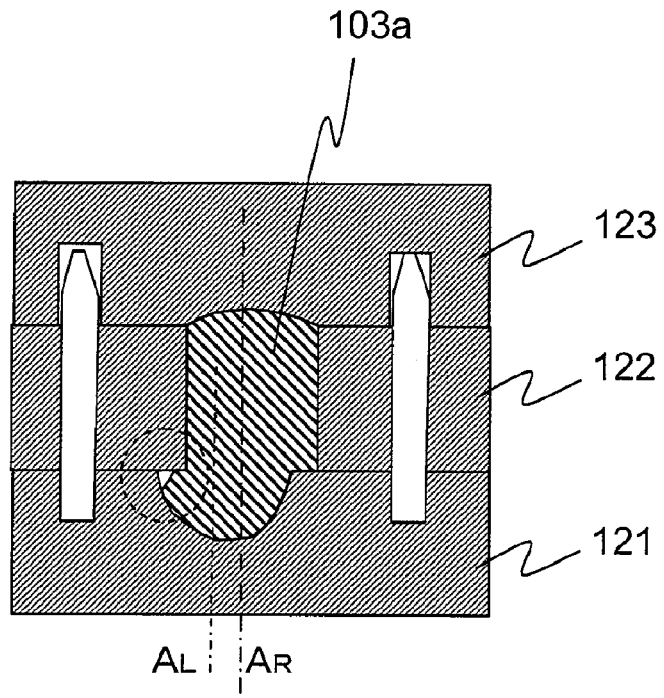
FIG. 9 is a diagram for explaining problems possibly occurring during fabrication of the glass lens shown in FIGS. 4A and 4B.
Figure 10A:
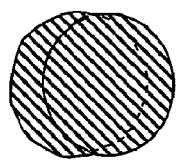
FIG. 10A and FIG. 10B are respectively a plan view and a side view of a glass lens which is partially chipped off.
Figure 10B:
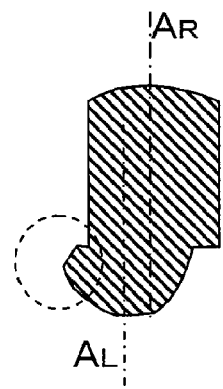

As described above, the glass lens 103 used in the related optical module has the lens portion 132 partially projecting out from the side face of the base 131. This may lead to a problem that an unfilled region is produced in the inside the mold as indicated by the dashed-line circle in FIG. 9 when the glass lens 103 is formed by molding. A glass lens 103a fabricated under this condition is shown in FIG. 10A and FIG. 10B. As shown in the dashed-line circle in FIG. 10B, the glass lens 103a is chipped in its part corresponding to the unfilled region produced during the molding.

Figure 11:
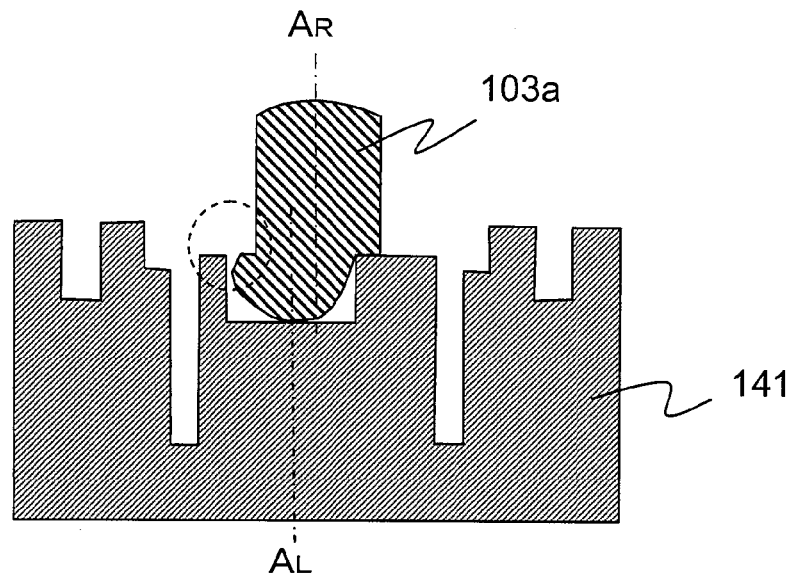
FIG. 11 is a diagram for explaining problems possibly occurring when a receptacle is fabricated using the partially chipped glass lens.
Figure 12:
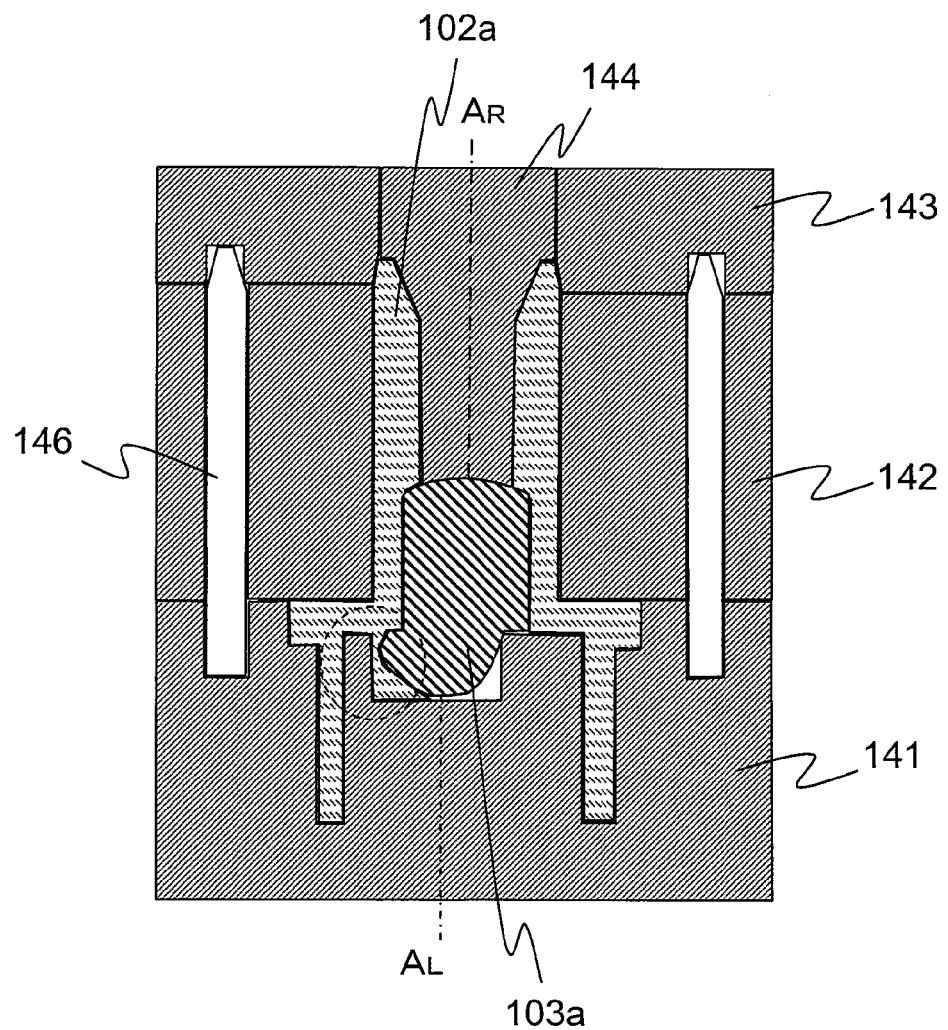
FIG. 12 is a diagram for further explaining problems possibly occurring when the receptacle is fabricated using the partially chipped glass lens.
Figure 13:
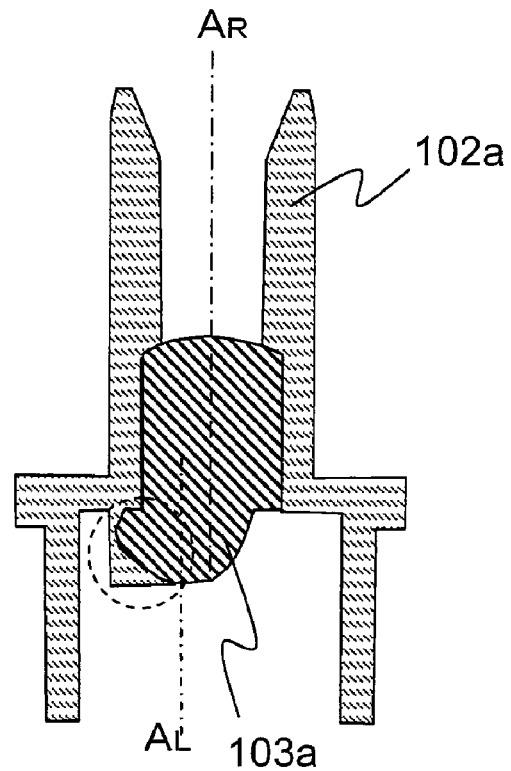
FIG. 13 is a diagram showing a receptacle fabricated using a partially chipped glass lens.

When the receptacle 102 is formed by injection molding using the partially chipped glass lens 103a, there is produced an unintended gap between the lower mold 141 and the glass lens 103a in the region indicated by the dashed-line circle in FIG. 11. As a result, when forming the receptacle 102, resin will leak into the gap and a part of the surface of the lens portion 132 will be covered with the resin as shown in FIG. 12 and FIG. 13.

Figure 14:
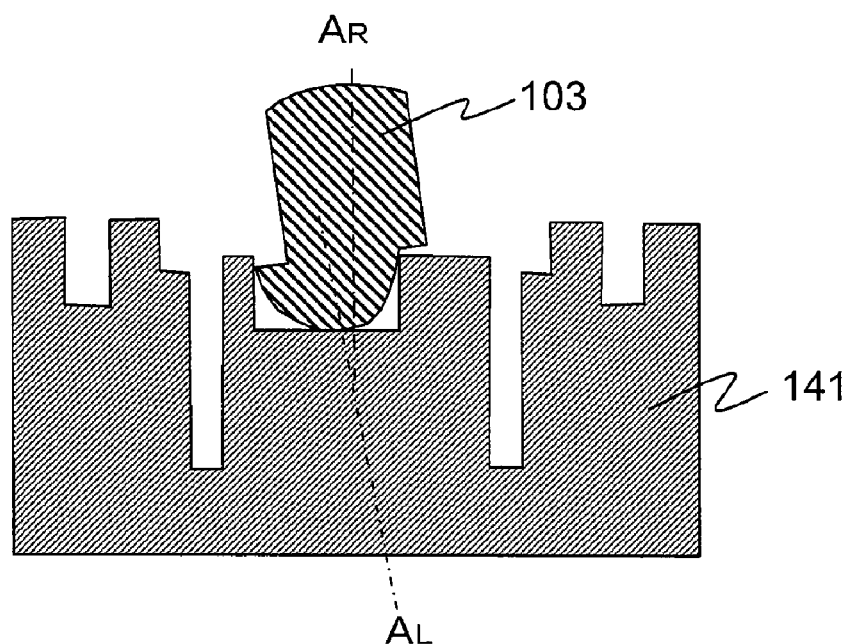
FIG. 14 is a diagram for explaining another problem possibly occurring when a receptacle is fabricated using the glass lens shown in FIGS. 4A and 4B.
Figure 15:
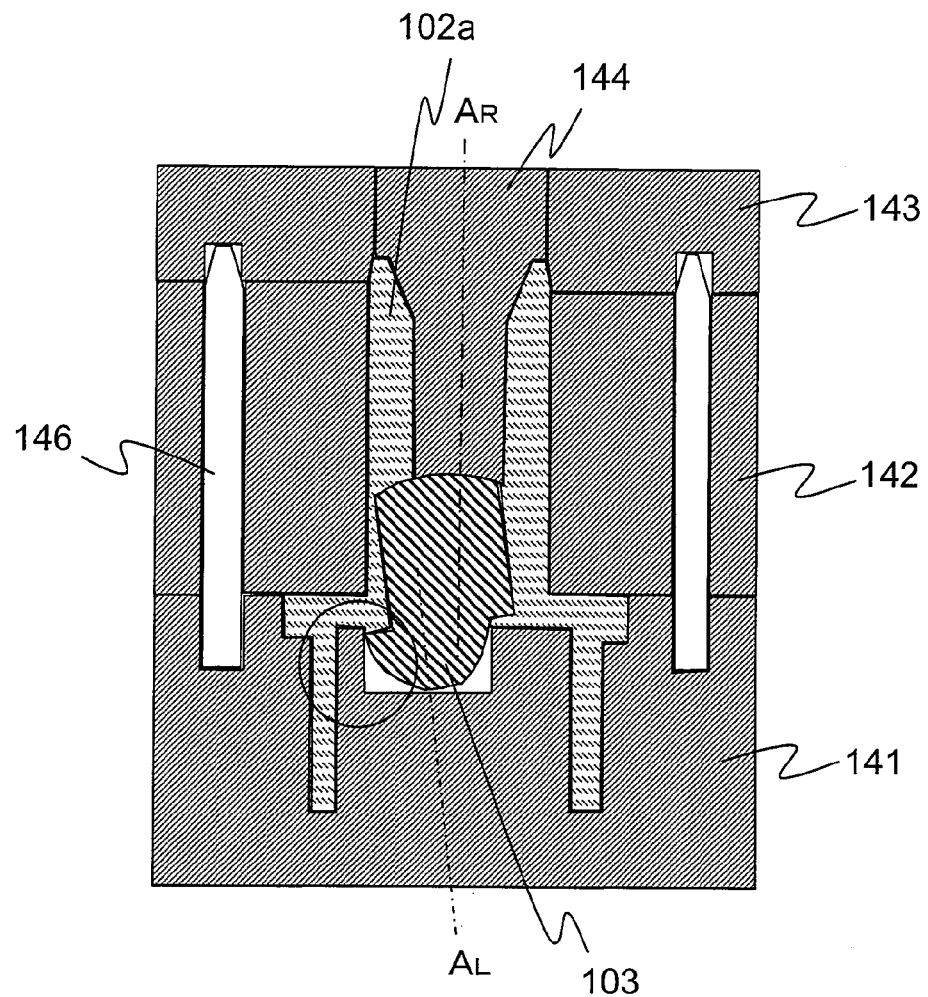
FIG. 15 is a diagram showing a state in which a receptacle has been formed by injection molding, leaving unsolved the problems as explained with reference to FIG. 14.
Figure 16:
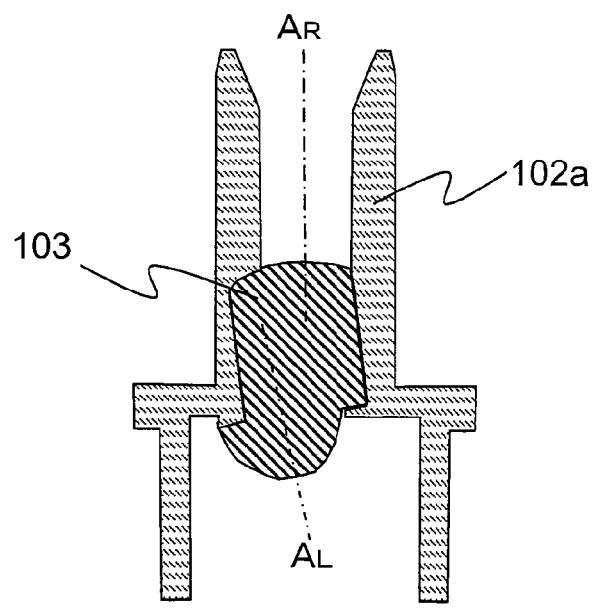
FIG. 16 is a diagram showing the receptacle of FIG. 15.

In addition, when the related glass lens 103 is placed in the lower mold 141 of the receptacle forming mold, the glass lens comes into contact with the lower mold 141 not only in a small contact area but also at an off-centered position due to the shape of the glass lens. As a result, as shown in FIG. 14, the glass lens 103 is placed in the lower mold 141 of the receptacle folding mold in a tilted position from a predetermined direction (direction along the central axis $A_R$ of the optical connector insertion opening in the receptacle 102). Or, the glass lens 103 may be tilted by molding pressure during the molding. When the receptacle 102 is formed by molding with the glass lens 103 being tilted, as shown in FIG. 15 and FIG. 16, the central axis $A_L$ of the lens portion 132 will be tilted with respect to the central axis $A_R$ of the optical connector insertion opening of the receptacle 102a.

This invention therefore provides a physically connectable optical module which is designed to prevent adhesion of resin to the surface of the lens portion 132 of the glass lens 103 and to prevent the lens portion 132 from tilting with respect to the receptacle 102.

An exemplary preferred embodiment of this invention will be described in detail with reference to the accompanying drawings.

Figure 17:
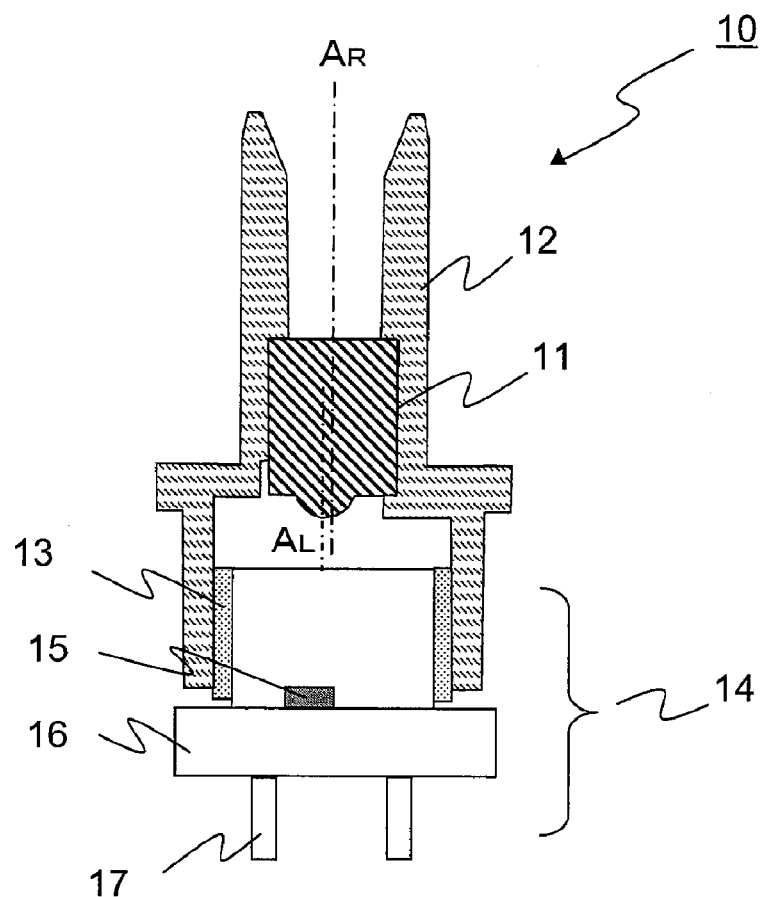
FIG. 17 is a cross-sectional view showing a configuration of an optical module according to an exemplary embodiment of this invention.

FIG. 17 shows a schematic configuration of an optical module according to an embodiment of this invention. This optical module 10 is used, for example, as an optical communication coaxial type high-speed transmission or reception optical module for long-distance transmission.

The shown optical module 10 has a lens body (which is herein a lens made of glass, and hereafter referred to as a glass lens) 11, a receptacle 12 formed integrally with the glass lens 11, and a CAN package 14 attached to the receptacle 12 using an adhesive 13.

The receptacle 12 has in its upper part an insertion opening for receiving an optical connector (not shown).

The CAN package 14 has a light-receiving or light-emitting element 15 for converting an optical signal emitted from an optical fiber of the optical connector into an electrical signal, or converting an input electrical signal into an optical signal, a stem 16 supporting the light-receiving or light-emitting element 15, and a lead 17 extending from the rear face of the stem 16. When the light-receiving or light-emitting element 15 is a light-emitting element, the light-emitting element may be a semiconductor laser. When the light-receiving or light-emitting element 15 is a light-receiving element, the light-receiving element may be a photodetector.

Figure 18A:
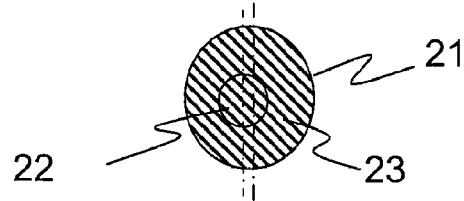
FIG. 18A and FIG. 18B are respectively a plan view and a side view of a glass lens included in the optical module of FIG. 17.
Figure 18B:
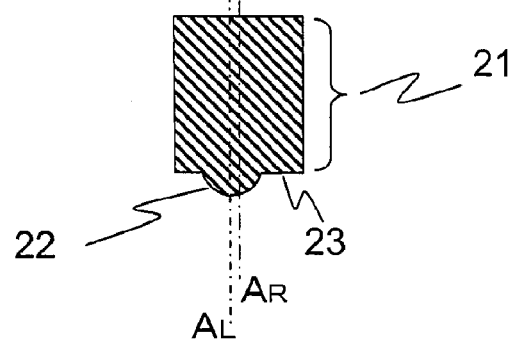

The glass lens 11 has, as shown in FIGS. 18A and 18B, a columnar (circular, quadratic, or polygonal columnar) base 21 held by the receptacle 11, and a lens portion 22 integrally formed with the base 21 and projecting from the base 21 downward as viewed in the figure. The lens portion 22 is for example a convex lens.

The top face of the base 21 is a contact surface to be in contact with the optical connector (optical fiber), while the bottom face is an opposing surface opposing the contact surface. There are provided, on the opposing surface, the lens portion 22 and a flat portion (plane portion) 23 surrounding the lens portion 22. The lens portion 22 is formed such that its central axis $A_L$ is parallel with the central axis of the base 21 (generally, corresponding to the central axis $A_R$ of the optical connector insertion opening in the receptacle 12), while being offset (off-centered) from the central axis of the base 21. Further, the lens portion 22 is positioned such that the central axis of the base 21 passes the lens portion 22.

In other words, the optical module 10 has the receptacle 12 having a central axis (corresponding to the central axis $A_R$), and the lens body 11. The lens body 11 has the columnar base 21 held by the receptacle 12 so that a central axis thereof is corresponding to the central axis of the receptacle 12. The lens body 11 further has the lens portion 22 projected from a base end surface (23) of the columnar base 21 and having the central axis $A_L$ offset from the central axis of the columnar base. The lens portion 22 is apart from a side surface of the columnar base 21.

Next, referring to FIGS. 19A, 19B, and 19C, a method of fabricating the glass lens 11 used in the optical module 10 shown in FIG. 17 will be described.

Figure 19A:
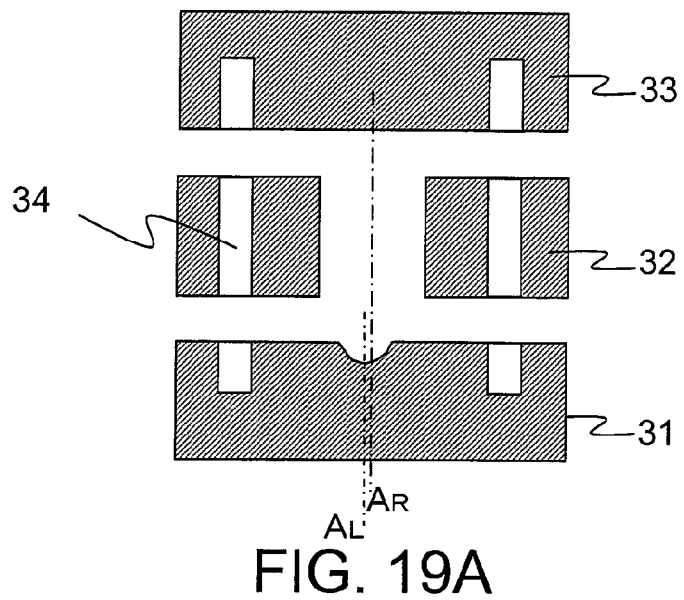
FIGS. 19A to 19C are diagrams for explaining a method of fabricating a glass lens included in the optical module of FIG. 17, FIG. 19A showing a configuration example of a mold used for the fabrication, FIG. 19B showing a state in which a glass material is placed in the mold, FIG. 19C showing a state in which the glass material has been hot pressed in the mold.

As shown in FIG. 19A, the glass lens 11 can be formed by a Grass Molding Press method using a mold divided into three parts consisting of a lower mold 31, a middle mold 32, and an upper mold 33. These molds are formed with guide holes or bores 34 for inserting mold guides.

Figure 19B:
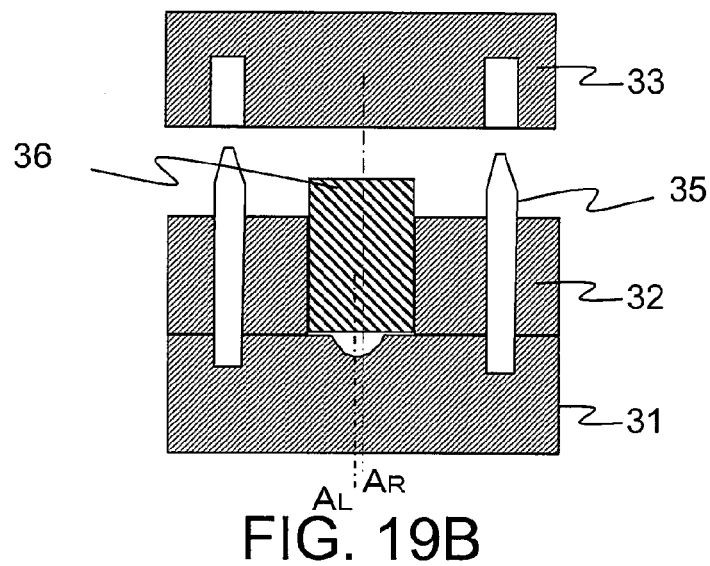
Figure 19C:
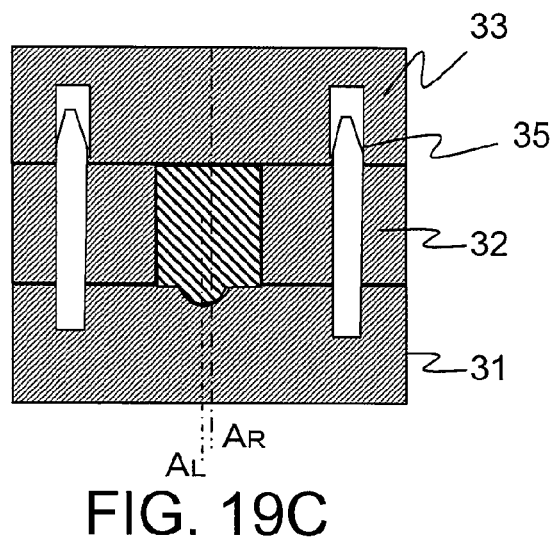

As shown in FIG. 19B, the lower mold 31 and the middle mold 32 are aligned with each other using mold guides 35, and a glass material 36 is placed in a cavity formed within these molds. Further, the upper mold 33 is aligned using the mold guides 35.

The glass material 36 is heated to a temperature equal to or higher than the glass transition point and equal to or lower than the softening point. Then, as shown in FIG. 19C, the glass material 36 is molded under pressure, thereby producing a glass lens 11.

According to this embodiment, the lens portion 22 of the glass lens 11 is formed to project downward from the opposing surface of the base 21 and not to project sideward. This prevents the glass lens 11 from being chipped during molding thereof. Accordingly, there is little risk that the surface of the lens portion 22 is covered with the receptacle 12 when fabricating the receptacle 12.

Next, referring to FIGS. 20A and 20B, FIG. 21, and FIGS. 22A and 22B, a method of fabricating the receptacle 12 integrated with the glass lens 11.

Figure 20A:
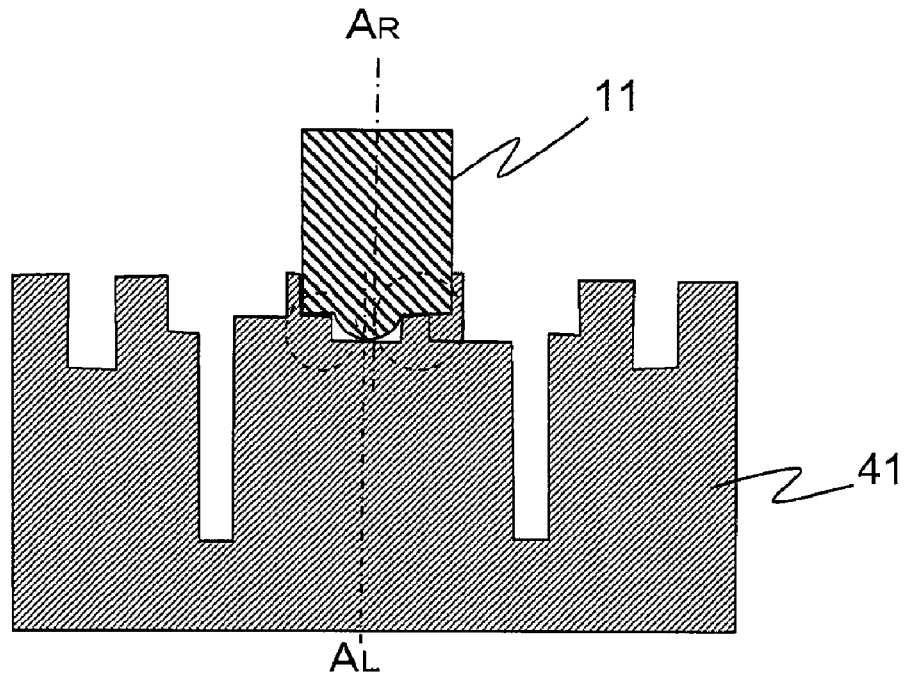
FIG. 20A and FIG. 20B are respectively an A-A cross-sectional view and a plan view showing a state in which a glass lens is placed in the lower mold of the receptacle forming mold.
Figure 20B:
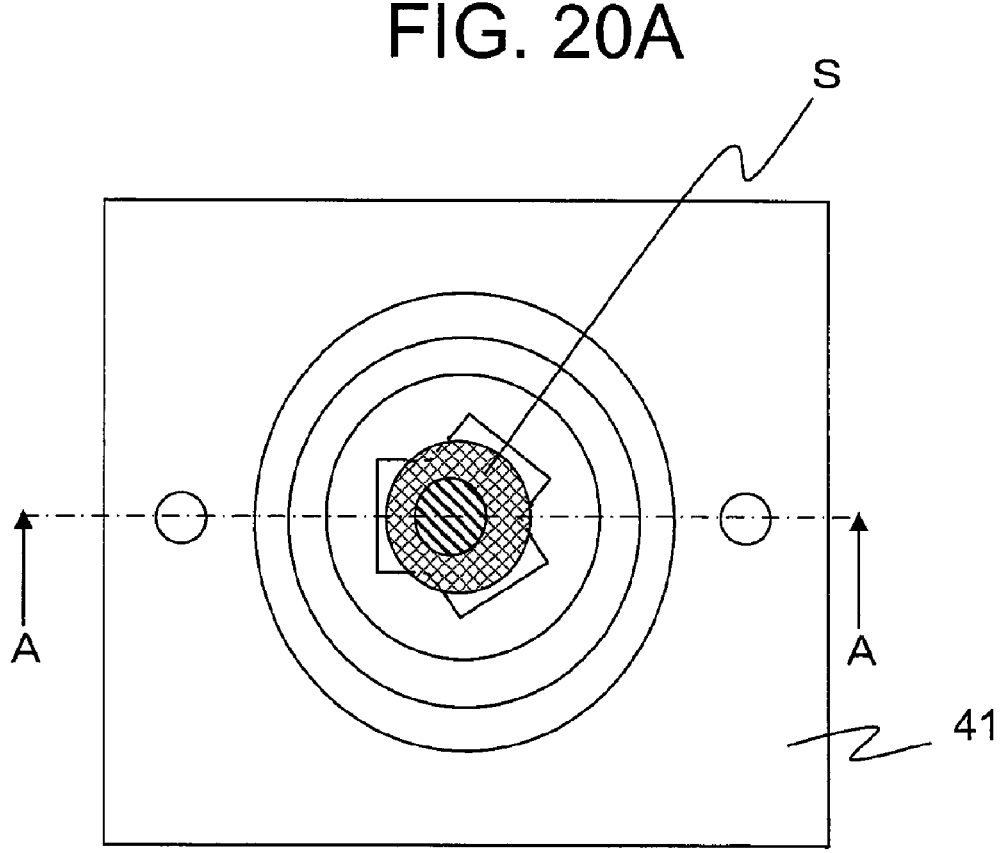

In the first step, as shown in FIGS. 20A and 20B, the glass lens 11 is placed at a predetermined position on a lower mold 41 which is one of the parts of a receptacle forming mold. The glass lens 11 is placed such that the central axis of the base 21 is matched with the central axis $A_R$ of the optical connector insertion hole in the receptacle.

As described above, the glass lens 11 is formed such that the lens portion 22 is surrounded by the flat portion 23. Accordingly, the glass lens 11 and the lower mold 41 come into contact with each other in the region indicated by the dashed-line circles in FIG. 20A and in the region S indicted by cross-hatching in FIG. 20B. This means that the lower surface (opposing surface) of the glass lens 11 can be supported in the periphery of the base by the flat plane in the lower mold 41 substantially uniformly without deviation. This makes it possible to place the glass lens 11 without tilting with respect to a predetermined direction (direction along the central axis $A_R$) and to keep the position stably during injection molding.

Figure 21:
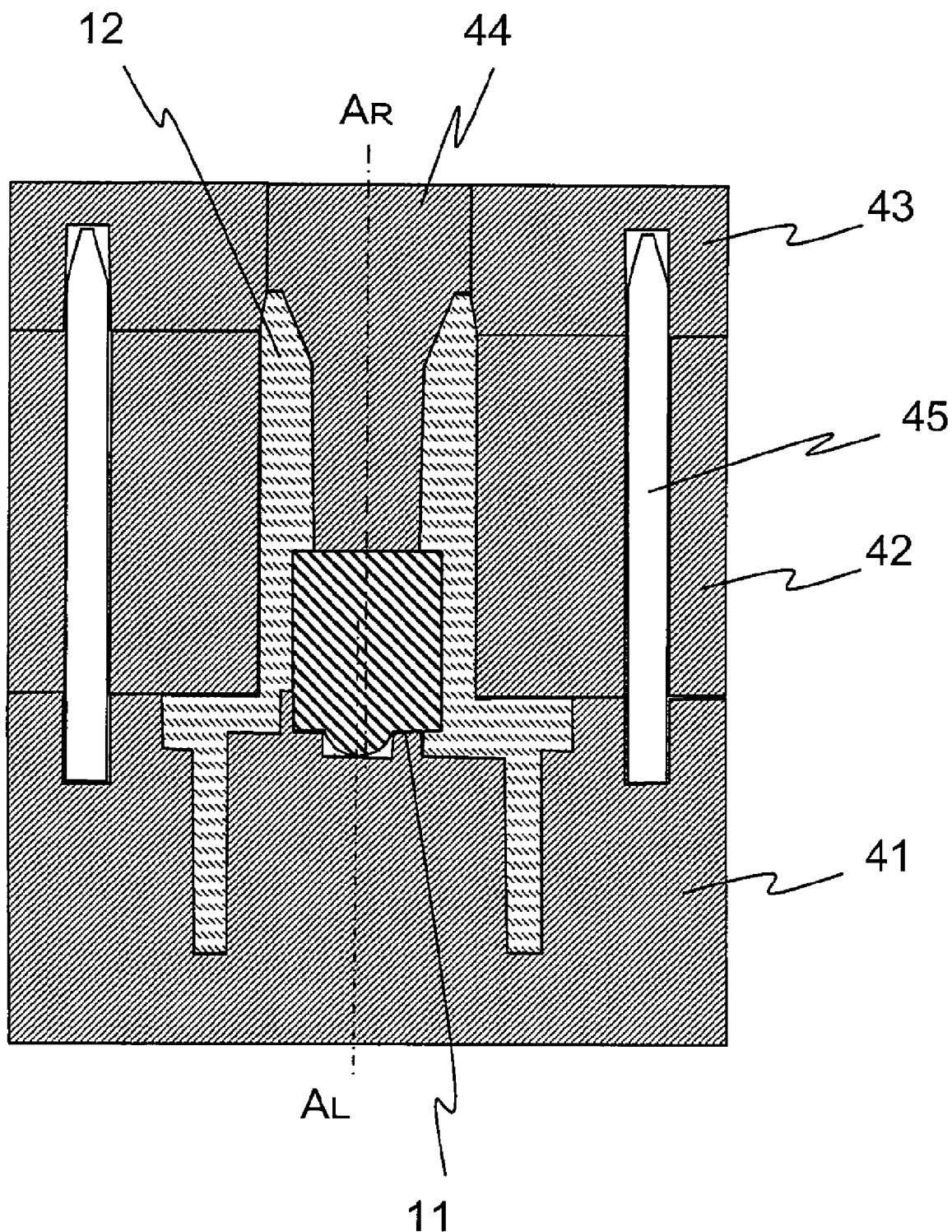
FIG. 21 is a diagram showing a state in which the receptacle is formed injection molding in the mold.
Figure 22A:
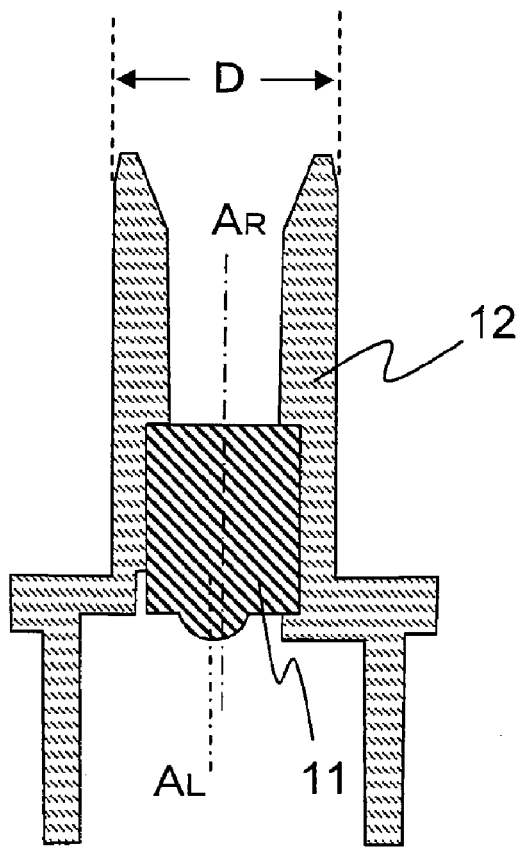
FIG. 22A and FIG. 22B are respectively a cross-sectional view and a bottom view of the receptacle integrated with the glass lens.
Figure 22B:
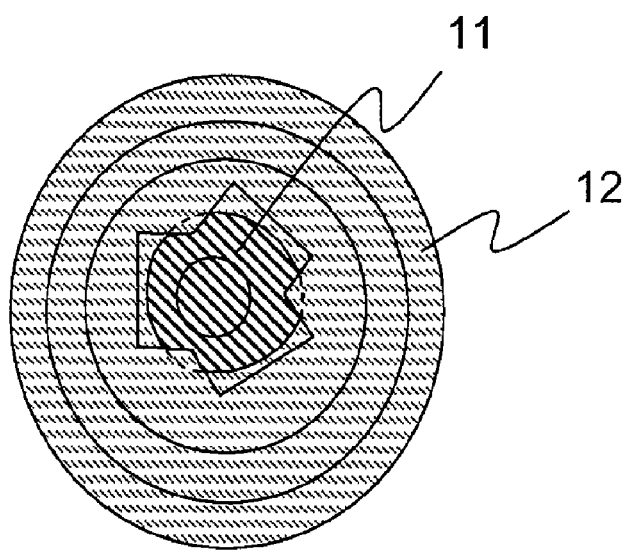

Next, as shown in FIG. 21, a middle mold 42, an upper mold 43, and an optical connector insertion hole forming pin 44 are assembled while being aligned with each other using mold guides 45, and the receptacle 12 is formed by injection molding. In this process, the glass lens 11 is integrated with the receptacle 12. The obtained receptacle 12 having the glass lens 11 attached is shown in FIG. 22A and FIG. 22B.

The receptacle 12 thus obtained is combined with the CAN package 14 to provide a coaxial type transmission module or reception module.

As described above, in the optical module 10 according to this embodiment, the lens portion 22 of the glass lens 11 does not project sideward from the base 21, which prevents chipping of the glass lens 11. Additionally, the contact surface between the glass lens 11 (opposing surface) and the mold used for injection molding of the receptacle 12 is flat, and the contact region between them is off-centered very little. Therefore, the glass lens 11 can be kept stably in its position while being prevented from tilting when the receptacle 12 is formed by molding. Further, since the glass lens 11 is prevented from being chipped off and from tilting with respect to the receptacle 12, the yield can be improved and the cost reduction can be achieved.

In the optical module 10 according to this embodiment, it is desirable to minimize the diameter of the lens portion 22 of the glass lens 11 so that the contact area between the glass lens and the receptacle forming mold is made as wide as possible, in other words so that the surface area of the flat portion 23 is made as large as possible.

When the diameter of the lens portion 22 is reduced, there arises a risk that a part of light emitted by the semiconductor laser (light-receiving or light-emitting element 15) or the optical connector will not enter the lens surface. However, this problem can be overcome by adjusting the length of the base 21, or the distance between the glass lens 11 and the light-receiving or light-emitting element 15.

When an LC type connector is used as the optical connector, for example, the receptacle sleeve has an outer diameter (indicated by D in FIG. 22A) of 2.98 to 3 mm, and the glass lens 11 can be provided by a glass lens having a diameter (in case of a quadrangular columnar lens, a side length (minimum distance between opposing sides passing the center)) of about 2 mm. It can be estimated here that a beam emitted from an optical fiber in the optical connector will have a diameter of 0.42 mm when entering the lens portion 22, as described later. In this case, the effective diameter required for the lens portion 22 is 0.65 mm when an offset of about 0.1 mm is set in order to prevent reflected return light reflected by the lens surface from entering the optical fiber. Therefore, the lens portion 22 with a diameter of around 0.8 mm will be sufficient. As described above, since the glass lens 11 with a diameter of 2 mm can be used, the lens portion 22 with a diameter of 0.8 mm can be formed while being offset to the base 21 without projecting sideward from the side face of the base 21. Thus, according to this embodiment, the diameter of the lens portion 22 can be set to a value corresponding to 40% or less of the diameter of the base 21.

The reason why the diameter of a beam entering the lens portion 22 is estimated to be 0.42 mm in the above description will be described below.

In order to satisfy the requirement that the light reflection attenuation should be 27 dB or more, the glass lens 11 is made of a material having a refractive index of 1.38 to 1.56. This is based on a Fresnel formula. It is assumed here that the glass material has a refractive index of 1.50. It is also assumed that the length of the base 21 is 3.5 mm. The optical fiber of the optical connector is a single-mode fiber, and a beam emitted from the optical fiber is a Gaussian beam.

When a Gaussian beam having a wavelength $\lambda$ and a beam radius $w_0$ has traveled in the air for a distance z, the beam has a beam radius $w(z)$ obtained by the following equation (1):

$$w(z) = w_0 \times \sqrt{1 + \left(\frac{z}{z_0}\right)^2} \quad (1)$$

where $z_0 = \pi \times w_0^2/\lambda$.

When the refractive index of the glass lens 11 is represented by n, and the length of the base 21 is represented by z', the beam will have, after it has traveled for a distance z' through the glass having the refractive index n, a beam radius that is equal to the beam radius after the beam has traveled in the air for a distance $z=z'/n$.

If it is assumed here that the single-mode fiber has a mode-field diameter of 9.2 µm, a beam emitted from the optical fiber will have a beam radius $w_o$ represented as 9.2/2 µm=4.6 µm=4.6×10$^{-3}$ mm. The wavelength $\lambda$ of the beam is represented as $\lambda$=1.31 µm=1.31×10$^{-3}$ mm.

Substituting the assumed conditions described above into the equation (1), the beam radius on the lens surface can be obtained as follows.

$$w(z) = w_0 \times \sqrt{1 + \left(\frac{z}{z_0}\right)^2}$$

$$= 4.6 \times 10^{-3} \times \sqrt{1 + \left(\frac{3.5/1.5}{\pi \times (4.6 \times 10^{-3})^2 / 1.31 \times 10^{-3}}\right)^2}$$

$$= 4.6 \times 10^{-3} \times \sqrt{1 + \left(\frac{3.5}{1.5} \times \frac{1.31 \times 10^{-3}}{\pi \times (4.6 \times 10^{-3})^2}\right)^2}$$

$$\approx 0.21 \text{ [mm]}$$

Consequently, the beam diameter on the lens surface can be estimated by multiplying the resulting value by 2, that is, it is estimated as 0.42 mm.

Although this invention has been described in conjunction with a preferred embodiment thereof, this invention is not limited to the foregoing embodiment but may be modified in various other manners within the scope of the appended claims.

The above description has been made as a particular example. When the central axis $A_L$ of the lens portion 22 is offset from the central axis of the base 21 (generally, corresponding to the central axis $A_R$ of the optical connector insertion opening of the receptacle 12) by an offset amount doff [mm], and the diameter of the base 21 (if the base shape is not circular columnar, the minimum distance between opposing sides passing the center) is represented by $\Phi 1$ [mm], and the diameter of the lens portion 22 is represented by $\Phi 2$ [mm], the glass lens 11 can be designed to satisfy the conditions, $\Phi 1/2 > \Phi 2/2 + $doff, and $w(z') < \Phi 2/2 - $doff so that the flat portion 23 can be formed around the lens portion 22. Further, desirable optical coupling can be ensured since light emitted from the semiconductor laser (light-receiving or light-emitting element 15) or the optical connector can be received reliably at the lens surface.

Still further, although the contact surface of the glass lens is a flat surface in the above embodiment, it may be a curved surface.

What is claimed is:
1. An optical module comprising:
   a receptacle receiving an optical connector attached to a distal end of an optical fiber; and
   a lens body having a contact surface coming into contact with the distal end of the optical fiber when the optical connector is received by the receptacle, wherein:
   the lens body has the contact surface and an opposing surface opposing the contact surface, the lens body further having a columnar base held by the receptacle, a lens portion and a flat portion, the lens portion and the flat portion being formed on the opposing surface integrally with the base, and
   the lens portion is completely surrounded by the flat portion and off-centered with respect to the base, wherein when a diameter or a minimum distance between opposing sides passing a center of the columnar base is represented by $\Phi 1$, a diameter of the lens portion is represented by $\Phi 2$, an offset amount between the central axis of the columnar base and the central axis of the lens portion is represented by Doff, a length of the columnar base is represented by $z'$, and a radius of a beam having traveled through the lens body for a distance $z'$ is represented by $W(z')$, the lens body is designed to satisfy $\Phi 1/2 > \Phi 2/2 + \text{Doff}$ and $W(z') < \Phi 2/2 - \text{Doff}$.

2. The optical module as claimed in claim 1, wherein the lens body is made of glass.

3. The optical module as claimed in claim 2, wherein the lens body is formed by Glass Molding Press method.

4. The optical module as claimed in claim 1, wherein a CAN package having a light-emitting or light-receiving element is assembled to the receptacle.

5. An optical module comprising:
a receptacle having a central axis, and
a lens body having a columnar base held by the receptacle so that a central axis thereof is corresponding to the central axis of the receptacle, and a lens portion projected from a base end surface of the columnar base and having a central axis offset from the central axis of the columnar base, wherein
an entirety of an outer perimeter of the lens portion is located apart from a side surface of the columnar base,
wherein when a diameter or a minimum distance between opposing sides passing a center of the columnar base is represented by $\Phi 1$, a diameter of the lens portion is represented by $\Phi 2$, an offset amount between the central axis of the columnar base and the central axis of the lens portion is represented by Doff, a length of the columnar base is represented by $z'$, and a radius of a beam having traveled through the lens body for a distance $z'$ is represented by $W(z')$, the lens body is designed to satisfy $\Phi 1/2 > \Phi 2/2 + \text{Doff}$ and $W(z') < \Phi 2/2 - \text{Doff}$.

6. The optical module as claimed in claim 5, wherein the receptacle provides an optical connector insertion opening receiving an optical connector attached to a distal end of an optical fiber.

7. The optical module as claimed in claim 6, wherein the receptacle holds a CAN package having a light-emitting or light-receiving element.

* * * * *